US011979491B2

(12) United States Patent
Qiu

(10) Patent No.: US 11,979,491 B2
(45) Date of Patent: *May 7, 2024

(54) TRANSMISSION OF SECURE INFORMATION IN A CONTENT DISTRIBUTION NETWORK

(71) Applicant: ARRIS Enterprises LLC, Suwanee, GA (US)

(72) Inventor: Xin Qiu, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,989

(22) Filed: Nov. 10, 2022

(65) Prior Publication Data

US 2023/0155814 A1 May 18, 2023

Related U.S. Application Data

(63) Continuation of application No. 16/953,017, filed on Nov. 19, 2020, now Pat. No. 11,528,132.

(Continued)

(51) Int. Cl.
*H04L 29/06* (2006.01)
*H04L 9/08* (2006.01)
*H04L 9/32* (2006.01)

(52) U.S. Cl.
CPC ............ *H04L 9/083* (2013.01); *H04L 9/0866* (2013.01); *H04L 9/321* (2013.01)

(58) Field of Classification Search
CPC ....... H04L 9/083; H04L 9/0866; H04L 9/321; H04L 63/0428; H04L 63/061; H04L 9/0861
See application file for complete search history.

(56) References Cited

U.S. PATENT DOCUMENTS

2015/0052359 A1\* 2/2015 Castillo ................. H04L 9/0825
713/171
2016/0188317 A1\* 6/2016 Hilliar ..................... H04L 67/34
717/172

(Continued)

OTHER PUBLICATIONS

Motorola Solutions: "[33.180] R16 TrK-IO and InK-IO", 3GPP Draft; S3-193998, vol. SA WG3, No. Reno (US); Nov. 18, 2019-Nov. 22, 2019 Nov. 11, 2019 (Nov. 11, 2019), XP051824338 (Year: 2019).\*

(Continued)

Primary Examiner — Yogesh Paliwal
(74) Attorney, Agent, or Firm — Chernoff, Vilhauer, McClung & Stenzel, LLP

(57) ABSTRACT

A method and apparatus for providing user key material from a server to a client is disclosed. The method comprises receiving a first message from the client in a server, the first message having a user key material request, an access token and an identifier of a transport key (TrK-ID), validating the user key material request according to the access token, generating a response having user key material responsive to the user key material request, encrypting the response according to the transport key (TrK), and transmitting a second message comprising the response from the server to the client. The client decrypts the second message according to the transport key (TrK) and validates the second message using the identifier of the transport key (TrK-ID).

15 Claims, 5 Drawing Sheets

Related U.S. Application Data

(60) Provisional application No. 62/937,768, filed on Nov. 19, 2019.

(56) References Cited

U.S. PATENT DOCUMENTS

| | | | |
|---|---|---|---|
| 2018/0109378 A1* | 4/2018 | Fu | H04L 9/0897 |
| 2020/0296086 A1* | 9/2020 | Gray | H04L 9/3247 |

OTHER PUBLICATIONS

International Search Report and Written Opinion Re: Application No. PCT/US2020/061339 dated Feb. 10, 2021.
Motorola Solutions: "[33.180] R16 TrK-IO and InK-IO", 3GPP Draft; S3-193998, vol. SA WG3, No. Reno (US); Nov. 18, 2019-Nov. 22, 2019 Nov. 11, 2019 (Nov. 11, 2019), XP051824338.
Samsung: "Security procedure for S-KMC and S-KMS", 3GPP Draft; S3-194393, vol. SA WG3, No. Reno, US,; Nov. 18, 2019-Nov. 22, 2019 Nov. 11, 2019 (Nov. 11, 2019), XP051824703.
Motorola Solutions et al: "Fix KMS reference points", 3GPP Draft; 33179_CR0002R2_(REL-13)_S3-160751 Rev of 698 Re\ of 479 to Fix KMS Reference Points, vol. SA WG3, No. San Jose del Cabo, Mexico; May 9, 2016-May 13, 2016 Jun. 12, 2016 (Jun. 12, 2016), XP051110471.
Motorola Solutions: "[33.180] R16 TrK-IO and InK-IO indication", 3GPP Draft; S3-201333, vol. SA WG3, No. e-Meeting; May 11, 2020-May 15, 2020 May 11, 2020 (May 11, 2020), XP051883085.

* cited by examiner

TRANSMISSION OF SECURE INFORMATION IN A CONTENT DISTRIBUTION NETWORK

CROSS-REFERENCE TO RELATED APPLICATIONS

This application is a continuation of U.S. patent application Ser. No. 16/953,017, filed Nov. 19, 2020, which claims benefit of U.S. Provisional Patent Application No. 62/937,768, entitled "TRANSMISSION OF SECURE INFORMATION IN A CONTENT DISTRIBUTION NETWORK," by: Xin Qiu, filed Nov. 19, 2019, which application is hereby incorporated by reference herein.

BACKGROUND

1. Field

The present disclosure relates to systems and methods for securely transmitting information in a content distribution network, and in particular to a system and method for transmitting keys and other sensitive information within that network.

2. Description of the Related Art

The dissemination of content such as media programs and other data is performed via cable transmission, satellite transmission, and transmission via the Internet. Increasingly, such dissemination is performed to mobile devices using wireless broadband networks such as LTE (Long Term Evolution).

5G is the fifth generation of cellular network technology, which also can be used to disseminate data, but at higher rates than that of LTE and previous broadband cellular network technologies. Security architectures, procedures, and information flows needed to protect mission critical services inherent in applications such as mission critical services (MCX) which include mission critical push-to-talk (MCPTT), mission critical video (MCVideo) and mission critical data (MCData) are described in "3rd Generation Partnership Project; Technical Specification Group Services and System Aspects; Security of the mission critical service; (Release 16)" published by the 3RD GENERATION PARTNERSHIP PROJECT (3GPPP), September 2019, (hereinafter 3GPPP specification) which is hereby incorporated by reference and referred to as the 3GPPP document.

This specification describes procedures for the provision of key material from a key management server to a key management client. While such key materials can be securely provided within a Secure Hypertext Transfer Protocol (HTTPS) construct using encrypted communications, additional security is desired.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. To address the requirements described above, this document discloses a system and method for providing user key material from a server to a client. In one embodiment, the method comprises receiving a first message from the client in a server, the first message having a user key material request, an access token and an identifier of a transport key (TrK-ID), validating the user key material request according to the access token, generating a response having user key material responsive to the user key material request, encrypting the response according to the transport key (TrK), and transmitting a second message comprising the response from the server to the client. In one embodiment, the client decrypts the second message according to the transport key (TrK) and validates the second message using the identifier of the transport key (TrK-ID)

Other embodiments are evidenced by a processor communicatively coupled to a memory storing processor instructions comprising instructions for performing the foregoing operations.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

For key management authorization, the Key Management Client in the user equipment presents an access token to the Key Management server over HTTP. The access token is a short-lived token that conveys the user's identity. It contains the MC service ID for at least one authorized service. The Key Management Server validates the access token, and if successful, provides one or more sets of user-specific key material back to the user equipment Key Management Client based on the MC service ID(s) present in the access token (MCPTT ID, MCVideo ID and/or MCData ID). User specific key material includes identity based key information for media and signaling protection. This key management authorization may be repeated for each KM service the user is authorized to use (MCPTT, MCVideo, MCData). In order to secure the transfer of user specific key material from the KMS to the KMS client when using the TrK and InK, the KM client includes the TrK-ID and the InK-ID in the key management authorization request.

When a TrK is used to protect the transfer of key material between the KMS client and KMS, the mission critical user equipment TrK identifier (TrK-ID) is provided by the KMS client to the KMS during user key management authorization. If the InK-ID is not provided in the same user authorization request, the TrK is used for integrity protection. If the InK-ID is provided in the same user authorization request, then the InK is used for integrity protection.

Figure 1:
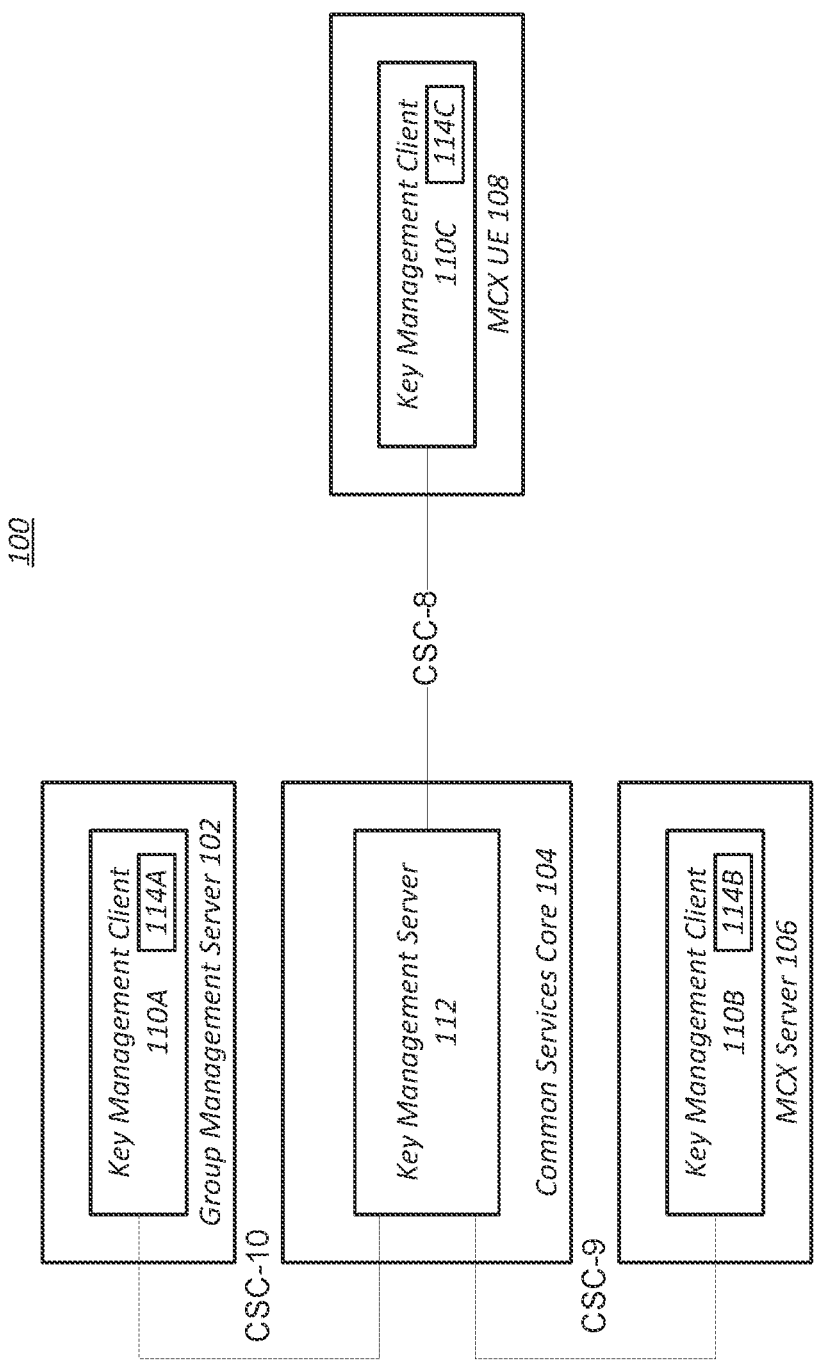
FIG. 1 is a diagram illustrating a key management functional model.

FIG. 1 is a diagram of key reference points CSC-8, CSC-9 and CSC-10 for a key management server paradigm 100 within a mission critical (MC) domain. These reference points include one or more key management clients 110A-110C (hereinafter referred to as KMC(s) or key management client(s) 110), each having respective trusted storage 114A-114C communicatively coupled to a key management server (KMS) 112, typically by a common services core (CSC) 104. The key management clients 110 may include a key management client 110A incorporated into a group management server 102, a key management client 110B incorporated into an MCX server 106, and a key management client 110C incorporated into user equipment (UE) 108. Any of the key management clients 110 are responsible for interfacing with the key management server 112 to request identity-specific key material from the key management server 112. The transfer of key material between the KMS 112 and the KMCs 110 is protected by using a transport key (TrK) to encrypt the key material before it is transmitted from the KMS 112 to the KMC 110.

The KMS 112 may or may not be located within the Common Services Core (CSC) 104 of the MC domain and may or may not make use of the HTTP proxy. If the KMS does not make use of the HTTP proxy, then a secure HTTP connection (HTTPS) is established directly between the KMS server 112 and the KMS client 110. In this case, each of CSC-8, CSC-9 and CSC-10 is a direct HTTP connection between the KMS Server 112 and KMS client 110 in the MC UE, MCX Server or group management server (GMS) (resp). The use of the TrK as defined in clause 9.3.3 of the may be used to protect the key material content in this configuration, and the InK may be used to integrity protect the key material content. If the KMS 112 does connect to and employ the use of the HTTP proxy, then for public safety users the TrK shall be used as defined in clause 9.3.3 of the 3GPPP document to protect the key material content and the InK should be used for integrity protection. In this case, each of CSC-8, CSC-9 and CSC-10 uses HTTP-1 and HTTP-2 between the KMS Server and KMS client in the MC UE, MCX Server or GMS (resp).

Figure 2A:
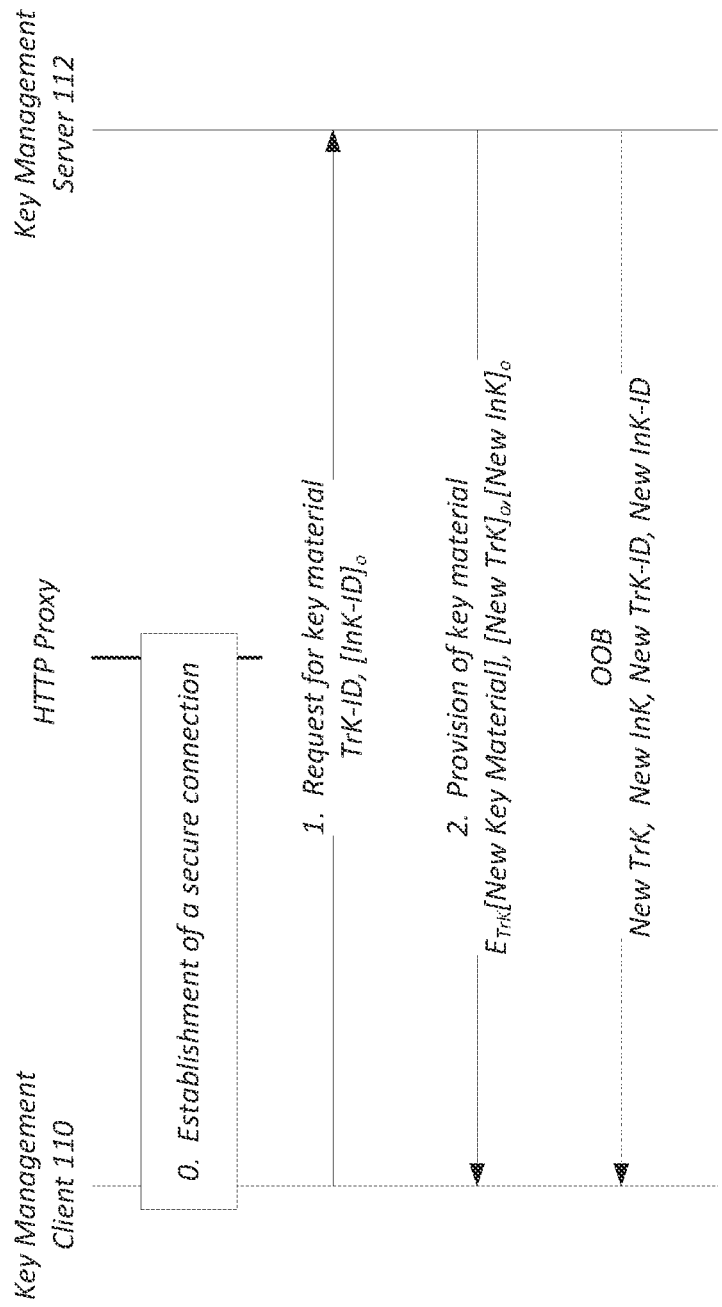
FIGS. 2A and 2B present diagrams illustrating security procedures for key management.

FIG. 2A is a diagram of security procedures used for key management and provisioning user key material from the key management server 112 to the key management client 110 (which may consist of any of the key management clients described above) via an proxy such as an HTTP proxy. The key management client (KMC) 110 establishes a connection to the key management server (KMS) 112, as shown in step 0. As with other elements in the Common Services Core 104, the connection is routed via, and secured by, the HTTP Proxy. The message flow below is within this secure connection. This message may be secured by an HTTP proxy and may be through a secure HTTP (HTTPS).

The KMC 110 makes a request for user key material from the KMS 112 by transmitting an access token, as shown in step 1. As described further below, the request contains an access token to authenticate the user as defined in clause 5.1 3GPPP specification. The request shall also contain the TrK-ID and may contain the InK-ID. Requests may include any of the following KMSInit Request. This request is the first request sent to the KMS to setup the user. This type of request is permitted to the Home KMS or to Migration KMSs.

KMSKeyProv Request: This request is to obtain new key material from the KMS. The request may contain details of a specific identity (e.g. MCPTT ID) required for key management, and may contain a specific time for which the key material is required. This type of request is permitted to the Home KMS or to Migration KMSs.

KMSCertCache Request: This request is to obtain external KMS certificates associated with external security domains (managed by another KMS). The request may contain details of the latest version of the cache received by the client. This type of request shall only be made to the Home KMS.

KMS Redirect Response (KRR) upload: This procedure uploads a KRR received by the client to the Home KMS. This type of message shall only be sent to the Home KMS.

KMS Cert Request: This request is to obtain a single KMS certificate based on a provided KMS URI.

KMS Lookup: This message is to lookup the external KMS that should be used for a provided SIP URI.

KMS Redirect Upload: This message is to upload a received discovery request response to the KMS for audit purposes.

The access token is used by the KMS 112 to authenticate the request. The request also includes an identifier of the transport key (TrK) (e.g. TrK-ID) and may contain an optional identifier of an integrity key (InK) (e.g. InK-ID).

The request for user key material may include or be included with, for example, a request to set up the user, a request to obtain new key material from the KMS 112 or a request to obtain external KMS 112 digital certificates.

The KMS 112 provides a response based upon and responsive to the authenticated user and the authenticated user request. The response may include new key material and optionally, a new transport key (TrK) or integrity key (InK), as well as digital certificates associated with the identifier of the integrity key or user identity).

The new key material is encrypted using the transport key (TrK), and may also be signed by the transport key or the integrity key (InK). The transport key (TrK), integrity key (InK) and their identifiers (TrK-ID, InK-ID) are initially provisioned to the KMC 110 via an out of band (OOB) transmission and stored in tamper-resistant or tamper-proof storage such as trusted storage 114 of the KMC 110.

The responses include:

KMSInit Response. This response contains domain parameters and optionally, a new TrK and/or a new InK.

KMSKeyProv Response: This response provides new key material to the user and optionally, a new TrK and/or a new InK.

KMSCertCache Response: This response contains new or updated home KMS certificates and/or external KMS certificates required by the user for communications with external security domains.

KMS Cert Response: This response is a KMSCertCache Response containing a single KMS Certificate (or an error message).

KMS Lookup Response: This response is a to provide the client with information related to a Discovery Lookup request. Either the KMS URI that should be used for a user is provided, or permission is provided to use a specific External KMS.

Figure 2B:
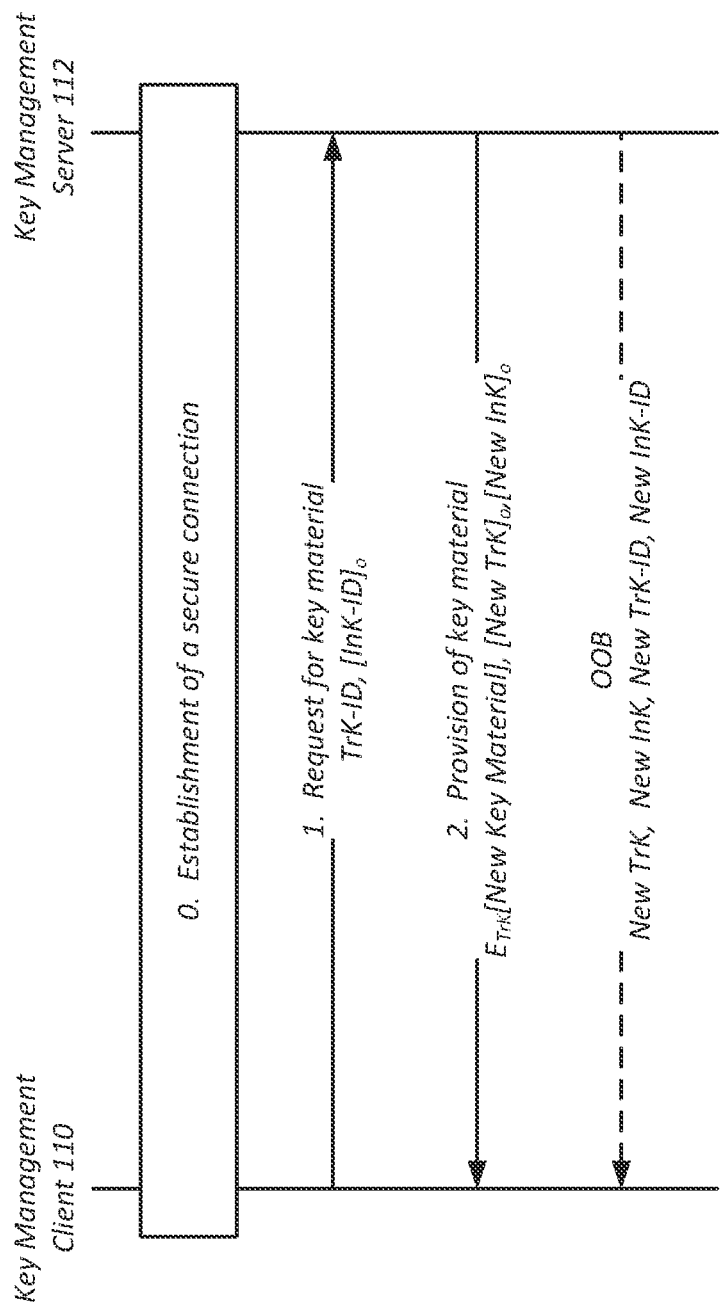

FIG. 2B is a diagram of security procedures used for key management and provisioning user key material from the key management server 112 to the key management client 110 (which may consist of any of the key management clients described above) without a proxy. In step 0, the key management client establishes a direct HTTPS connection to the KMS. The message flow that follows is within this secure connection. In step 1, the key management client makes a request to the KMS. As described below, the request may contain the TrK-ID and may contain the InK-ID. The same requests can be made as defined above with a proxy. In step 2, the KMS provides a response based upon the authenticated user and the user's request. Optionally, the key material itself may also be encrypted using a 256-bit transport key (TrK). The response may also be signed using the TrK or the InK. The TrK and InK are initially distributed via an out-of-band mechanism along with their 32-bit identifiers (TrK-ID and InK-ID respectively). As a result of this procedure, the key management client has securely obtained key material for use within the MC system.

To further secure the foregoing exchange protocol, the transport key identifier (TrK-ID) and/or the integrity key identifier (InK-ID) may be compromised, as they are protected only by the security offered by the communication link (e.g. HTTPS) when transmitted from the KMC 110 to the KMS 112. To prevent or at least detect such compromise, the foregoing protocol is modified so that the transport key identifier (TrK-ID) (and optionally, the integrity key identifier (InK-ID)) is included with the key material before encryption by the transport key (TrK). The KMC 110 can then compare the value of the decrypted transport key identifier (TrK-ID) with the value of the transport key identifier (TrK-ID) in its trusted store to validate the response before performing further processing.

Figure 3:
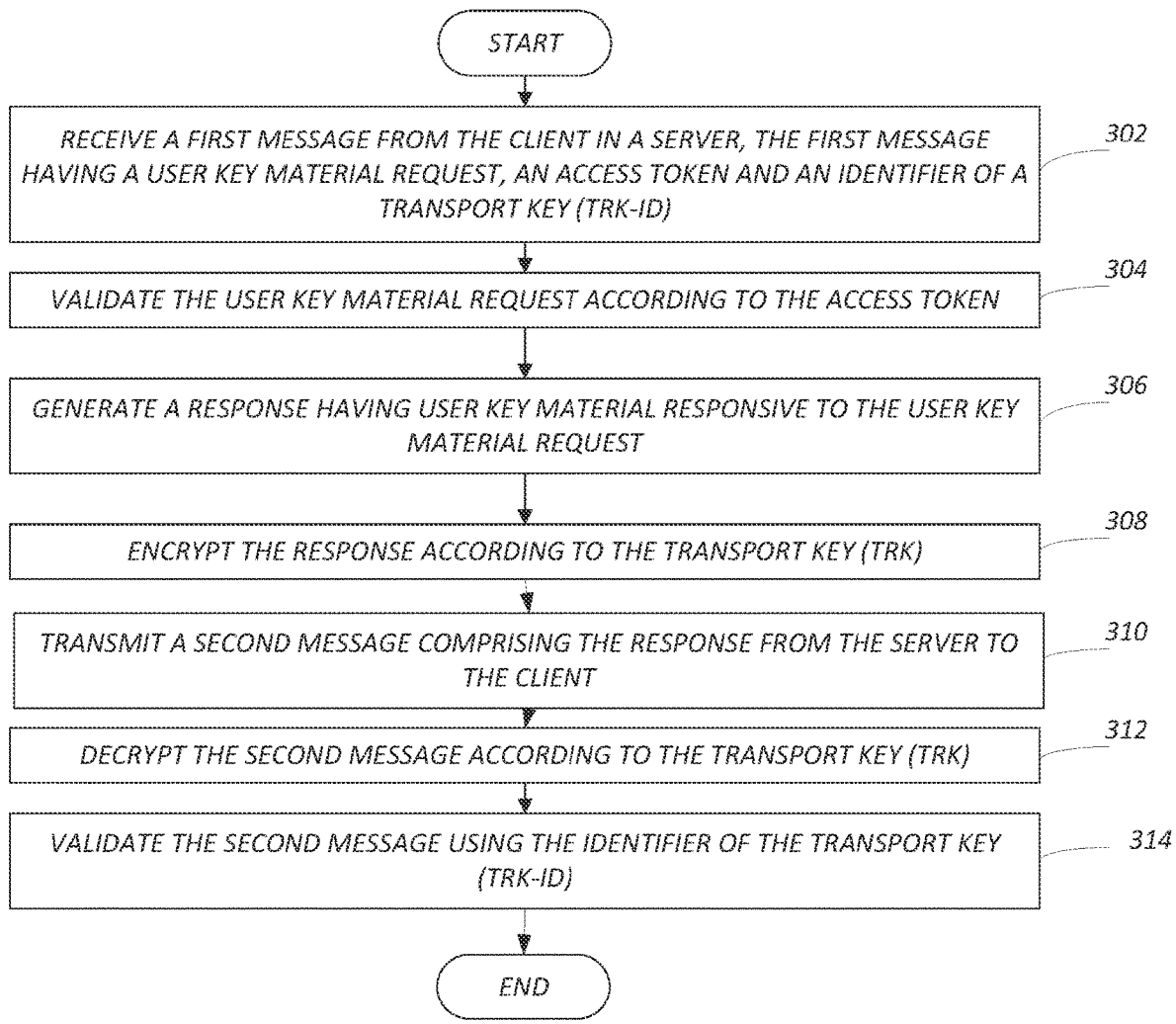
FIG. 3 is a diagram illustrating exemplary processing steps for providing user key material from a server to a client.

FIG. 3 is a diagram illustrating exemplary processing steps for providing user key material from a server such as KMS 112 to a client such as the KMC 110. In block 302, a first message is received from the KMC 110 in the KMS 112, the first message having a user key material request, an access token, and an identifier of a transport key (TrK-ID). In block 304, the user key material request is validated according to the access token. In block 306, a response is generated having user key material responsive to the user key material request. In block 308, this response is encrypted according to the transport key (TrK) identified in the request. In block 310, a second message comprising the response is transmitted to from the KMS 112 to the KMC 110. In block 312, the second message is decrypted by the requesting KMC 110 according to the transport key (TrK), and in block 314, the second message is validated using the identifier of the transport key (TrK-ID) by comparing the decrypted transport key identifier (TrK-ID) with the stored transport key identifier (TrK-TD).

In one embodiment, the identifier of the transport key (TrK-ID) or identifier of the integrity key (InK-ID) form a part of a digital certificate certified by a trusted entity such as a certificate authority (CA), and the second message is validated via the digital certificate. The second message is validated using the sender's (KMC 110) digital certificate which is validated through its certificate chain to the root. The identifier of the transport key (TrK-ID) (or the identifier of the integrity key (In K-ID)) is extracted from the sender's certificate after the certificate chain validation which can in turn be compared with the identifier of the transport key (TrK-ID) or the identifier of the integrity key (InK-ID) received in the first message. TrK-ID and InK-ID need not be limited to an identifier. Rather, they may comprise a user profile or any information that uniquely identifies the user.

In another embodiment, KMS 112 generates the response that further comprises the identifier of the transport key (TrK-ID). For example, the identifier of the transport key (TrK-ID) may simply be concatenated with the user key material (e.g. User key Material|TrK-ID). Upon receipt of the second message, the KMC 110 decrypts the message, thus decrypting and recovering the identifier of the transport key, and compares the decrypted value of the identifier of the transport key with the identifier of the transport key stored in trusted storage 114. The second message is verified only if the two values match.

In still another embodiment the second message further comprises the identifier of the transport key (TrK-ID), and the KMC compares the decrypted value of the identifier of the transport key with the identifier of the transport key (TrK-ID) received in the second message. Again, the second message is verified only if the two values match.

In still further embodiments, the integrity key ID (InK-ID) can be included with the first message, and that integrity key ID (InK-ID) included in the response before encryption by the KMS. Upon decryption of the second message, the identifier of the integrity key ID (InK-ID) can be extracted and compared to the identifier of the integrity key ID (InK-ID) stored in trusted storage or included as a part of the second message. In either case, the second message is verified only if the two values match.

Hardware Environment

Figure 4:
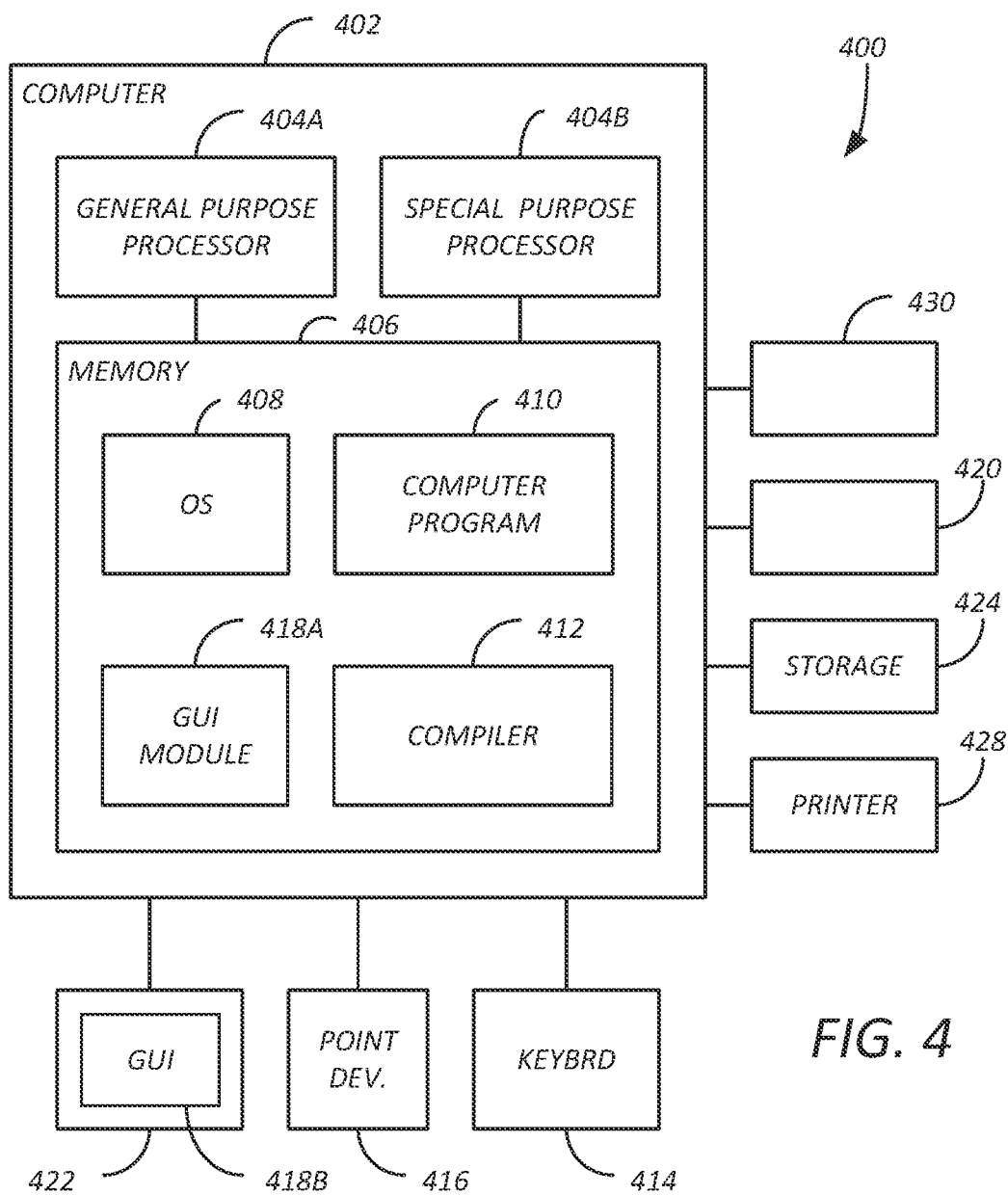
FIG. 4 is a diagram presenting an exemplary computer system that could be used to implement processing elements of the geolocation system.

FIG. 4 illustrates an exemplary computer system 400 that could be used to implement processing elements of the above disclosure, including the KMC 110 and KMS 112. The computer 402 comprises a processor 404 and a memory, such as random access memory (RAM) 406. The computer 402 is operatively coupled to a display 422, which presents images such as windows to the user on a graphical user interface 418B. The computer 402 may be coupled to other devices, such as a keyboard 414, a mouse device 416, a printer 428, etc. Of course, those skilled in the art will recognize that any combination of the above components, or any number of different components, peripherals, and other devices, may be used with the computer 402.

Generally, the computer 402 operates under control of an operating system 408 stored in the memory 406, and interfaces with the user to accept inputs and commands and to present results through a graphical user interface (GUI) module 418A. Although the GUI module 418B is depicted as a separate module, the instructions performing the GUI functions can be resident or distributed in the operating system 408, the computer program 410, or implemented with special purpose memory and processors. The computer 402 also implements a compiler 412 which allows an application program 410 written in a programming language such as COBOL, C++, FORTRAN, or other language to be translated into processor 404 readable code. After completion, the application 410 accesses and manipulates data stored in the memory 406 of the computer 402 using the relationships and logic that was generated using the compiler 412. The computer 402 also optionally comprises an external communication device such as a modem, satellite link, Ethernet card, or other device for communicating with other computers.

In one embodiment, instructions implementing the operating system 408, the computer program 410, and the compiler 412 are tangibly embodied in a computer-readable medium, e.g., data storage device 420, which could include one or more fixed or removable data storage devices, such as a zip drive, floppy disc drive 424, hard drive, CD-ROM drive, tape drive, etc. Further, the operating system 408 and the computer program 410 are comprised of instructions which, when read and executed by the computer 402, causes the computer 402 to perform the operations herein described. Computer program 410 and/or operating instructions may also be tangibly embodied in memory 406 and/or data communications devices 430, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

The foregoing discloses an apparatus, method and system for providing user key material from a server to a client, including: receiving a first message from the client in a server, the first message having a user key material request, an access token and an identifier of a transport key (TrK-ID); validating the user key material request according to the access token; generating a response having user key material responsive to the user key material request; encrypting the response according to the transport key (TrK); and transmitting a second message including the response from the server to the client; wherein the client: decrypts the second message according to the transport key (TrK); and validates the second message using the identifier of the transport key (TrK-ID).

Implementations may include one or more of the following features:

Any of the methods described above, wherein the response further includes the identifier of the transport key (TrK-ID); the client decrypts the second message according to the transport key (TrK) to recover a decrypted identifier of the transport key (TrK-ID) and uses the decrypted identifier of the transport key (TrK-ID) to validate the second message.

Any of the methods described above, wherein the second message further includes the identifier of the transport key (TrK-ID); the second message is validated by comparing the decrypted identifier of the transport key (TrK-ID) of the second message to the identifier of the transport key (TrK-ID) of the decrypted message.

Any of the methods described above, wherein the first message further includes a identifier of an integrity key (InK-ID); the response further includes the identifier of the integrity key (InK-ID); the second message further includes the identifier of the integrity key (InK-ID); the client decrypts the second message according to the transport key (TrK) to further recover a decrypted identifier of the integrity key (InK-ID) and uses the decrypted identifier of the integrity key (InK-ID) to validate the second message.

Any of the methods described above, wherein the encrypted response is signed by the transport key or the integrity key and is further validated according to the signed encrypted response.

Any of the methods described above, wherein the identifier of the transport key (TrK-ID) forms a part of a digital certificate certified by a trusted entity, and the second message is validated via the digital certificate.

Any of the methods described above, wherein the identifier of the transport key (TrK-ID) is stored in tamper-resistant storage of the client device.

One embodiment is evidenced by an apparatus for providing user key material from a server to a client, including: a processor; a memory, the memory communicatively coupled to the processor and storing processor instructions including processor instructions for: receiving a first message from the client in a server, the first message having a user key material request, an access token and an identifier of a transport key (TrK-ID); validating the user key material request according to the access token; generating a response having user key material responsive to the user key material request; encrypting the response according to the transport key (TrK); and transmitting a second message including the response from the server to the client; wherein the client: decrypts the second message according to the transport key (TrK); and validates the second message using the identifier of the transport key (TrK-ID).

Conclusion

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of provisioning user key material from a server to a client, comprising:
   (a) receiving a first request from the client by the server, the first request made for user key material that contains (i) an access token to authenticate the client and (ii) an identifier of a transport key (TrK-ID);
   (b) authenticating the request for the user key material according to the access token;
   (c) generating a response for the provisioning of user key material responsive to the request for the user key material;
   (d) encrypting the response for the provisioning of the user key material according to a transport key (TrK) identified by the identifier of the transport key (TrK-ID);
   (e) provisioning of key material comprising the encrypted response from the server to the client;
   (f) wherein the provisioning of key material is configured to be decrypted according to the transport key (TrK) and the provisioning of key material is configured to be validated using the identifier of the transport key (TrK-ID);
   (g) wherein the provisioning of key material further comprises the identifier of the transport key (TrK-ID);
   (h) wherein said provisioning of key material is further configured to be decrypted according to the transport key (TrK) to recover a decrypted identifier of the transport key (TrK-ID) and said provisioning of key material is further configured to be validated using the decrypted identifier of the transport key (TrK-ID).

2. The method of claim 1, wherein the provisioning of key material is further configured to be validated by comparing the decrypted identifier of the transport key (TrK-ID) of the provisioning of key material to the identifier of the transport key (TrK-ID) of the decrypted message.

3. A method of provisioning user key material from a server to a client, comprising:
   (a) receiving a first request from the client by the server, the first request made for user key material that contains (i) an access token to authenticate the client and (ii) an identifier of a transport key (TrK-ID);

9

(b) authenticating the request for the user key material according to the access token;
(c) generating a response for the provisioning of user key material responsive to the request for the user key material;
(d) encrypting the response for the provisioning of the user key material according to a transport key (TrK) identified by the identifier of the transport key (TrK-ID);
(e) provisioning of key material comprising the encrypted response from the server to the client;
(f) wherein the provisioning of key material is configured to be decrypted according to the transport key (TrK) and the provisioning of key material is configured to be validated using the identifier of the transport key (TrK-ID);
(g) wherein the provisioning of key material further comprises the identifier of the transport key (TrK-ID);
(h) the first request further comprises an identifier of an integrity key (InK-ID);
the response further comprises the identifier of the integrity key (InK-ID);
the provisioning of key material further comprises the identifier of the integrity key (InK-ID); and
the provisioning of key material configured to be decrypted according to the transport key (TrK) to further recover a decrypted identifier of the integrity key (InK-ID) and the provisioning of key material configured to use the decrypted identifier of the integrity key (InK-ID) to validate the provisioning of key material.

4. The method of claim 3, wherein the encrypted response is signed by the integrity key or the transport key and is further validated according to the signed encrypted response.

5. A method of provisioning user key material from a server to a client, comprising:
(a) receiving a first request from the client by the server, the first request made for user key material that contains (i) an access token and (ii) an identifier of a transport key (TrK-ID);
(b) authenticating the request for the user key material according to the access token;
(c) generating a response for the provisioning of user key material responsive to the request for the user key material;
(d) encrypting the response for the provisioning of the user key material according to a transport key (TrK) identified by the identifier of the transport key (TrK-ID);
(e) provisioning of key material comprising the encrypted response from the server to the client;
(f) wherein the provisioning of key material is configured to be decrypted according to the transport key (TrK) and the provisioning of key material is configured to be validated using the identifier of the transport key (TrK-ID);
(g) wherein the identifier of the transport key (TrK-ID) forms a part of a digital certificate certified by a trusted entity, and the provisioning of key material is validated via the digital certificate.

6. The method of claim 5, wherein the identifier of the transport key (TrK-ID) is stored in tamper-resistant storage of the client device.

7. An apparatus for provisioning user key material from a server to a client, comprising:
a processor;

10 a memory, the memory communicatively coupled to the processor and storing processor instructions comprising processor instructions for:
(a) receiving a first request from the client by the server, the first request made for user key material the contains (i) an access token and (ii) an identifier of a transport key (TrK-ID);
(b) authenticating the request for the user key material according to the access token;
(c) generating a response for the provisioning of user key material responsive to the request for the user key material;
(d) encrypting the response for the provisioning of the user key material according to a transport key (TrK) identified by the identifier of the transport key (TrK-ID);
(e) provisioning of key material comprising the encrypted response from the server to the client;
(f) wherein the provisioning of key material is configured to be decrypted according to the transport key (TrK) and the provisioning of key material is configured to be validated using the identifier of the transport key (TrK-ID);
(g) wherein the provisioning of key material further comprises the identifier of the transport key (TrK-ID);
(h) wherein said provisioning of key material is further configured to be decrypted according to the transport key (TrK) to recover a decrypted identifier of the transport key (TrK-ID) and said provisioning of key material is further configured to be validated using the decrypted identifier of the transport key (TrK-ID).

8. The apparatus of claim 7, wherein the provisioning of key material is further configured to be validated by comparing a decrypted identifier of the transport key (TrK-ID) of the provisioning of key material to the identifier of the transport key (TrK-ID) of the decrypted message.

9. An apparatus for provisioning user key material from a server to a client, comprising:
a processor;
a memory, the memory communicatively coupled to the processor and storing processor instructions comprising processor instructions for:
(a) receiving a first request from the client by the server, the first request made for user key material the contains (i) an access token and (ii) an identifier of a transport key (TrK-ID);
(b) authenticating the request for the user key material according to the access token;
(c) generating a response for the provisioning of user key material responsive to the request for the user key material;
(d) encrypting the response for the provisioning of the user key material according to a transport key (TrK) identified by the identifier of the transport key (TrK-ID);
(e) provisioning of key material comprising the encrypted response from the server to the client;
(f) wherein the provisioning of key material is configured to be decrypted according to the transport key (TrK) and the provisioning of key material is configured to be validated using the identifier of the transport key (TrK-ID);
(g) wherein the provisioning of key material further comprises the identifier of the transport key (TrK-ID);
(h) the first request further comprises an identifier of an integrity key (InK-ID);

the response further comprises the identifier of the integrity key (InK-ID);

the provisioning of key material further comprises the identifier of the integrity key (InK-ID); and the provisioning of key material configured to be decrypted according to the transport key (TrK) to further recover a decrypted identifier of the integrity key (InK-ID) and the provisioning of key material configured to use the decrypted identifier of the integrity key (InK-ID) to validate the provisioning of key material.

10. The apparatus of claim 9, wherein the encrypted response is signed by the transport key or the integrity key and is further validated according to the signed encrypted response.

11. An apparatus for provisioning user key material from a server to a client, comprising:
- a processor;
- a memory, the memory communicatively coupled to the processor and storing processor instructions comprising processor instructions for:
  - (a) receiving a first request from the client by the server, the first request made for user key material the contains (i) an access token and (ii) an identifier of a transport key (TrK-ID);
  - (b) authenticating the request for the user key material according to the access token;
  - (c) generating a response for the provisioning of user key material responsive to the request for the user key material;
  - (d) encrypting the response for the provisioning of the user key material according to a transport key (TrK) identified by the identifier of the transport key (TrK-ID);
  - (e) provisioning of key material comprising the encrypted response from the server to the client;
  - (f) wherein the provisioning of key material is configured to be decrypted according to the transport key (TrK) and the provisioning of key material is configured to be validated using the identifier of the transport key (TrK-ID);
  - (g) wherein the provisioning of key material further comprises the identifier of the transport key (TrK-ID);
  - (h) wherein the identifier of the transport key (TrK-ID) forms a part of a digital certificate certified by a trusted entity, and the provisioning of key material is validated via the digital certificate.

12. A method of receiving user key material by a client from a server, comprising:
- (a) providing a first request by the client to the server, the first request made for user key material that contains (i) an access token and (ii) an identifier of a transport key (TrK-ID);
- (b) wherein the first request is configured in a manner such that the user key material request is validated according to the access token;
- (c) receiving a provisioning of the user key material by the client from the server comprising an encrypted response;
- (d) wherein the encrypted response is encrypted according to a transport key (TrK) identified by the identifier of the transport key (TrK-ID) having user key material responsive to the user key material request;
- (e) wherein the encrypted response further comprises the identifier of the transport key (TrK-ID);
- (f) decrypting the provisioning of the user key material according to the transport key (TrK);
- (g) validating the provisioning of the user key material using the identifier of the transport key (TrK-ID).

13. The method of claim 12 further comprising wherein the identifier of the transport key (TrK-ID) forms a part of a digital certificate certified by a trusted entity, and the provisioning of the user key material is validated via the digital certificate.

14. A method of receiving user key material by a client from a server, comprising:
- (a) providing a first request by the client to the server, the first request made for user key material that contains (i) an access token and (ii) an identifier of a transport key (TrK-ID);
- (b) wherein the first request is configured in a manner such that the user key material request is validated according to the access token;
- (c) receiving a provisioning of the user key material by the client from the server comprising an encrypted response;
- (d) wherein the encrypted response is encrypted according to a transport key (TrK) identified by the identifier of the transport key (TrK-ID) having user key material responsive to the user key material request;
- (e) decrypting the provisioning of the user key material according to the transport key (TrK);
- (f) validating the provisioning of the user key material using the identifier of the transport key (TrK-ID);
- (g) wherein the identifier of the transport key (TrK-ID) forms a part of a digital certificate certified by a trusted entity, and the provisioning of the user key material is validated via the digital certificate.

15. The method of claim 14 further comprising wherein the encrypted response further comprises the identifier of the transport key (TrK-ID).

* * * * *